United States Patent [19]

Schmalstieg et al.

[11] Patent Number: 5,215,618

[45] Date of Patent: Jun. 1, 1993

[54] A PROCESS FOR BONDING SUBSTRATES WITH AN ESTER GROUP-CONTAINING HOT MELT ADHESIVE

[75] Inventors: Lutz Schmalstieg, Cologne; Eduard Haensel, Wuppertal; Klaus Nachtkamp, Duesseldorf; Heinrich Königshofen, Bergisch Gladbach; Otto Ganster, Odenthal, all of Fed. Rep. of Germany

[73] Assignee: Bayer Aktiengesellschaft, Fed. Rep. of Germany

[21] Appl. No.: 742,251

[22] Filed: Aug. 8, 1991

[30] Foreign Application Priority Data

Aug. 15, 1990 [DE] Fed. Rep. of Germany ....... 4025779

[51] Int. Cl.⁵ .................................. C09J 4/00
[52] U.S. Cl. .................. 156/331.7; 156/331.4; 528/26; 528/28; 528/29; 528/59; 560/330; 560/355; 560/358
[58] Field of Search ............ 156/331.4, 331.7; 528/28, 59, 29, 26; 560/330, 358, 355

[56] References Cited

U.S. PATENT DOCUMENTS

| | | | |
|---|---|---|---|
| 2,441,066 | 5/1948 | Hanford | 528/29 |
| 2,584,351 | 2/1952 | Hunter et al. | 528/26 |
| 3,870,556 | 3/1975 | Noll et al. | |
| 3,931,077 | 1/1976 | Uchigaki et al. | |
| 4,585,819 | 4/1986 | Reischle et al. | |
| 4,618,651 | 10/1986 | Gilch et al. | |
| 4,745,212 | 5/1988 | Mormann et al. | 528/26 |

FOREIGN PATENT DOCUMENTS 394760 10/1990 European Pat. Off. .
1668069 7/1971 Fed. Rep. of Germany .

OTHER PUBLICATIONS

Journal of Polymer Science, Part A: Polymer Chemistry Ed. 27 No. 13 Morman et al. "Polymers From Multifunctional Isocyanates II": Dec. 1989.

*Primary Examiner*—John J. Gallagher
*Attorney, Agent, or Firm*—Joseph C. Gil; Godfried R. Akorli

[57] ABSTRACT

Disclosed herein is a process for bonding substrates comprising applying a hot-melt adhesive to the surface of at least one of the substrates and contacting the surface of said substrate with the surface of the other substrate, said adhesive containing an ester group-containing polyisocyanate which is a solid below 30° C. and liquid above 100° C., corresponding to formula (I)

$$A(OCO\text{-}B\text{-}NCO)_n \qquad (I)$$

in which n stands for a whole number or a fraction (statistical average) of from 2 to 6, A stands for an n-valent organic group such as is obtained by removal of hydroxyl groups from an n-valent polyhydroxyl compound in the molecular weight (Mn) range of from 800 to 6000 containing ester and/or carbonate groups and B stands for an aliphatic, cycloaliphatic or aromatic hydrocarbon group having up to 18 carbon atoms.

6 Claims, No Drawings

A PROCESS FOR BONDING SUBSTRATES WITH AN ESTER GROUP-CONTAINING HOT MELT ADHESIVE

BACKGROUND OF THE INVENTION

This invention relates to new hot melt adhesives having a high setting rate and a low melt viscosity.

Reactive, moisture hardening hot melt adhesives from the class of isocyanate functional prepolymers are known, for example from DE-OS 2 401 320, EP A 0 107 097 or EP-A-0 125 009. Adhesives of the type mentioned in these prior publications are applied to substrates as hot melts and solidify on cooling and thus rapidly build up strength so that further processing of the substrates can be carried out within a short time. The final strength is obtained by the complete reaction of the free isocyanate groups still present, for example with atmospheric moisture, to form high molecular weight polyurethane polyureas. It is particularly advantageous to apply reactive hot melt adhesives without solvents. The disadvantage of the adhesives described in the aforesaid publications lies particularly in their high melt viscosity. For optimum wetting of a surface with the adhesives it is desirable to obtain as low a melt viscosity as possible.

The adhesives according to U.S. Pat. No. 5,019,638 also require a relatively high temperature to reduce the viscosity of the adhesive to a sufficiently low value for wetting surfaces. The adhesives are still found to have viscosities of from 7000 to 20,000 mPa.s at 130° C. and therefore cannot be used for bonding temperature sensitive substrates.

In view of the very short operating cycles nowadays customary in industry, it is necessary for the hot melt adhesives to set very rapidly by crystallization after their application so that the bonded substrates are immediately ready for further processing.

German Patent Application P 39 13 406.7 in the name of the present Applicants deals with prepolymers of the type which are preferred according to the invention, but it only deals with their use for the preparation of moisture hardening coating compounds or sealing compounds. The use of the prepolymers as hot melt adhesives or for the preparation of hot melt adhesives is not described in the Application which is, therefore, not a prior publication.

DE-OS 1 668 069 describes ester group-containing polyisocyanates which are said to be suitable as adhesives. However, since the polyisocyanates of this prior publication, as can be seen from the examples of embodiments, are based on a completely different type of low molecular weight polyhydroxyl compounds, they differ fundamentally in their melt characteristics from the polyisocyanates used according to the invention. This conclusion is justified in that the authors of the said prior publication have not taken into account hot melt adhesives of the type to be used according to the present invention.

It was, therefore, an object of the present invention to provide new reactive hot melt adhesives which would combine the advantages of a high setting speed with a low melt viscosity.

This problem has been solved by the use, according to the invention, of certain polyisocyanates containing ester groups described below.

SUMMARY OF THE INVENTION

The invention relates to a process for bonding substrates comprising applying a hot-melt adhesive to the surface of at least one of the substrates and contacting the surface of said substrate with the surface of the other substrate, said adhesive containing an ester group-containing polyisocyanate which is a solid below 30° C. and liquid above 100° C., corresponding to formula (1)

$$A(OCO\text{-}B\text{-}NCO)_n \qquad (I)$$

in which n stands for a whole number or a fraction (statistical average) of from 2 to 6, A stands for an n-valent organic group such as is obtained by removal of hydroxyl groups from an n-valent polyhydroxyl compound in the molecular weight (Mn) range of from 800 to 6000 containing ester and/or carbonate groups and B stands for an aliphatic, cycloaliphatic or aromatic hydrocarbon group having up to 18 carbon atoms.

Isocyanate prepolymers which are comparable in their constitution to the isocyanate prepolymers used according to the invention are already described in DE-OS 2 120 090. However, according to the teaching of the said publication, the isocyanate prepolymers are used for finishing textiles containing certain fibers. For this purpose, the isocyanate prepolymers are used in the form of highly diluted organic solutions or aqueous emulsions. The publication, therefore, gives no indication that crystalline isocyanate prepolymers are particularly suitable as hot melt adhesives. In particular, it makes no mention of the prepolymers which are particularly suitable according to the invention and which are prepared by the special process described below.

DESCRIPTION OF THE INVENTION

The isocyanate prepolymers corresponding to the general formula (I) to be used according to the invention are prepared by suitable modification of organic polyhydroxyl compounds corresponding to the general formula (V)

$$A(OH)_n \qquad (V)$$

This modification may comprise, for example, a reaction of the polyhydric alcohols with isocyanato-carboxylic acid chlorides corresponding to the general formula (III)

$$ClOC\text{—}B\text{—}NCO \qquad (III)$$

according to the teaching of DE-OS 2 120 090.

In these formulae, A, B and n have the meanings already indicated.

The polyhydroxyl compounds of formula (V) are often mixtures due to the method employed for their preparation. Hence, n may have a statistical average value of a fraction within the range given above. The same applies, of course, to the polyisocyanates of formula (I) used according to the invention, which are based on such polyol mixtures.

The polyhydroxyl compounds of formula (V) used for the preparation of the isocyanate prepolymers to be used according to the invention are preferably partially crystalline compounds which are solid at temperatures below 30° C., preferably below 40° C., and liquid above 100° C., preferably above 80° C. The isocyanate prepolymers of formula (I) based on such polyhydroxyl compounds are, to a large extent, similar in their melting properties to the polyhydroxyl compounds of formula (V) on which they are based, especially if they have been prepared by the preferred method described below. The ester group-containing polyisocyanates of formula (I) to be used according to the invention are, therefore, also polyisocyanates or polyisocyanate mixtures which are solid at temperatures below 30° C., preferably below 40° C., and liquid above 100° C., preferably above 80° C.

The starting materials of formula (III) or (V) which are preferred for the invention and the ester group-containing polyisocyanates of formula (I) which are preferred used for the invention are compounds in which n stands for a whole number or fraction of from 2 to 3, in particular 2, A stands for an n-valent group such as may be obtained by removal of hydroxyl groups from an n-valent polyhydroxyl compound in the molecular weight range of from 1000 to 5000 containing ester and/or carbonate groups, and B stands for an aliphatic hydrocarbon group having 2 to 10, in particular 5 to 10 carbon atoms. All the information given in connection with the molecular weight of the relatively high molecular weight alcohols of formula (III) are based on the molecular weight determined by vapor pressure osmometry. The average functionality is calculated from the hydroxyl group content and from the molecular weight thus determined.

Ester group-containing polyisocyanates of formula (I) which are particularly advantageous to use according to the invention are those whose preparation from the starting materials corresponding to formulae (III) and (V) have been carried out by a process analogous to that described in DE-OS 3 634 248.

In the said process, the polyhydroxyl compounds are converted in a first reaction stage into the corresponding O-silylated compounds corresponding to formula (II)

   (II)

by a method analogous to that described by M. Lalonde and C. H. Chan in "synthesis" 1985, pages 817 to 845. For this process, the polyhydroxyl compounds are reacted, for example, with chlorosilanes or disilazanes corresponding to the general formula (IV) or (VI)

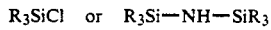

(IV)    (VI)

optionally with the aid of an auxiliary solvent. The reaction with a chlorosilane is generally carried out at a molar ratio of hydroxyl groups to chlorosilane of from 1:1 to 1:2 at temperatures from 0° to 80° C. The reaction, generally, requires the addition of an at least equivalent quantity of an organic base, e.g. pyridine or triethylamine, for binding the hydrogen chloride formed. The reaction with disilazanes is preferably carried out at a molar ratio of hydroxyl groups to disilazane of from 1:0.5 to 1:1 at temperatures from 60° C. to 140° C. until the liberation of ammonia has been completed. It is frequently advisable to add a small quantity of an acid catalyst, for example a chlorosilane of the type mentioned above.

Examples of suitable solvents optionally used for this reaction include n-hexane, cyclohexane, toluene, xylene, methoxypropyl acetate, ethyl acetate, butyl acetate, methyl ethyl ketone and mixtures of such solvents. Suitable chlorosilanes and disilazanes for the reaction are in particular those corresponding to the above mentioned formulae in which R stands for an alkyl group having 1 to 4 carbon atoms or a phenyl group, preferably a methyl group.

The O-silylated polyhydroxyl compounds corresponding to formula (II) are subsequently reacted with isocyanato carboxylic acid chlorides corresponding to the above mentioned general formula (III). The quantity of reactants is, generally, chosen to provide from 0.8 to 1.2 mol of silylated hydroxyl groups for each mol of chloro-carbonyl group.

The process is, generally, carried out with equimolar quantities of starting materials. The reaction of silylated hydroxyl compounds with isocyanato acid chlorides is generally carried out at temperatures from 50° to 150° C., optionally with the addition of known catalysts for this reaction, such as quinoline or pyridine.

A trialkyl or triaryl chlorosilane is formed as by-product of the reaction and can easily be removed from the reaction mixture by distillation.

This reaction may also be carried out in the presence or absence of a solvent exemplified above. Solvents may generally be omitted if the silylated hydroxyl compounds used have a sufficiently low viscosity for the process at the reaction temperature.

In accordance with the requirement of preparing solvent-free hot melt adhesives, the ester group-containing polyisocyanates of formula (I) are preferably prepared without the use of inert solvents of the type exemplified. If necessary, volatile substances, including any solvents used, may be removed from the ester group-containing polyisocyantes by distillation, e.g. by thin layer distillation.

Both in the preferred method of preparing the ester group-containing polyester isocyanates of formula (I) and in the direct reaction of the polyhydroxyl compounds with the chlorocarbonyl isocyanates (III) according to DE-OS 2 120 090, small quantities of dicarboxylic acid dichlorides may be used for obtaining particular properties. Examples of such dicarboxylic acid dichlorides include phthalic acid dichloride, isophthalic acid dichloride and terephthalic acid dichloride. In these cases also, the quantity of reactants is chosen to provide from 0.8 to 1.2 moles, preferably 1 mole of optionally silylated hydroxyl groups for each mole of chlorocarbonyl group.

The polyhydroxyl compounds corresponding to formula (V) are ester group-containing and/or carbonate group-containing polyhydroxyl compounds in the molecular weight range mentioned above and with the melt characteristics mentioned above, such as are known in principle from polyurethane chemistry. Partially crystalline polyester polyols carrying terminal hydroxyl groups such as are obtained in known manner by the reaction of polybasic carboxylic acids with excess quantities of polyhydric alcohols are particularly suitable.

The polybasic carboxylic acids used may in particular be aliphatic dicarboxylic acids having 6 to 14 carbon atoms, such as adipic acid, sebacic acid, azelaic acid, suberic acid, dodecane dicarboxylic acid or tetradecane dicarboxylic acid, and the acid component may also contain small quantities of cycloaliphatic or aromatic dicarboxylic acids or dicarboxylic acid anhydrides.

The polyhydric alcohols used for the preparation of the polyester polyols are preferably diols having 2 to 12 carbon atoms, e.g. ethylene glycol, propylene glycol, 1,4-dihydroxybutane, 1,6-dihydroxyhexane or 1,12-dihydroxy-dodecane, but the alcohol component may also contain polyhydric alcohols such as trimethylolpropane or glycerol so that the, compounds finally obtained are branched polyester polyols of formula (V) in which n stands for a whole number or fraction above 2 within the limits mentioned above. It is particularly preferred, however, to prepare the polyester polyols exclusively from difunctional starting materials so that the polyester polyols obtained consist essentially of polyester diols.

Polyesters of lactones such as $\epsilon$-caprolactone or of hydroxycarboxylic acids such as $\Omega$-hydroxycarboxylic acid may also be used.

The hydroxyl group-containing polycarbonates used may be of known type, e.g. those prepared by the reaction of diols such as propane-1,3-diol, butane-1,4-diol and/or hexane-1,6-diol, diethylene glycol, triethylene glycol, tetraethylene glycol or thiodiglycol with diaryl carbonates, e.g. diphenyl carbonate, or phosgene (DE Auslegeschriften Nos. 1 694 080, 1 915 908 and 2 221 751; DE-Offenlegungsschrift 2 605 024).

Examples of suitable isocyanato carboxylic acid chlorides of formula (III) for the preparation of the isocyanate prepolymers include 3-isocyanatopropionic acid chloride, 4-isocyanatobutyric acid chloride, 6-isocyanatocaproic acid chloride, 11-isocyanatoundecanoic acid chloride, 4-isocyanatobenzoic acid chloride and 4-isocyanatocyclohexane carboxylic acid chloride. 6-isocyanatocaproic acid chloride is particularly preferred.

The ester group-containing polyisocyanates of formula (I) prepared by the described process from the starting materials exemplified above, and used according to the invention may be used as hot melt adhesives without further additives or they may be used as hot melt adhesives in a modified form.

The hot melt adhesives are applied solvent-free. They may be adjusted to the required viscosity for coating (2000 to 10,000 mPa.s) by heating them to a relatively low temperature, e.g. to 80°–120° C. At this temperature, the hot melt adhesives according to the invention have a surprisingly low viscosity and therefore wet the substrate very efficiently.

The property of the hot melt adhesives according to the invention of setting immediately by crystallization on cooling after their application results in a high initial bond strength similar to that of conventional hot melt adhesives since the adhesive spontaneously manifests a high cohesive force on cooling to a temperature below the melting point. Since the adhesives can be employed at comparatively very low temperatures due to their low melt viscosity, the substrate can be bonded together immediately after they have been coated. Owing to only the slight difference between the temperature of application and the crystallization temperature, the hot melt adhesives according to the invention provide the possibility of an extremely rational operating procedure, for example for the series production of bonded articles.

The hot melt adhesives according to the invention may be applied by methods already known for conventional hot melt adhesives. For example, the substrates which are to be bonded may be coated with the adhesives by roller application, by casting or, by application with extruders or by spraying.

The hot melt adhesives according to the invention have a virtually unlimited shelf life if they are stored with the exclusion of moisture at temperatures from room temperature to 50° C. They may be modified with fillers such as chalk, heavy spar or polymer powder such as PVC or CBS powder, dyes, resins and/or extender oils.

For building up the final strength within a sufficiently short time when using the preferred ester group-containing polyisocyanates (I) having aliphatically bound isocyanate groups, it is advisable to add reaction accelerators. These are catalysts known from polyurethane chemistry, e.g. tertiary amines such as triethylamine, pyridine, methyl pyridine, benzyl dimethylamine, N,N'-dimethylaminocyclohexane, N-methylpiperidine, pentamethy-diethylenetriamine, N,N'-dimethylpiperazine, etc. and metal salts such as iron(III) chloride, zinc chloride, zinc-2-ethyl caproate, tin(II)-2-ethylcaproate, dibutyl tin(II) dilaurate or molybdenum glycolate.

The moisture of the substrate and of the atmosphere is normally sufficient for final curing but the reaction may, of course, be accelerated by spraying with water or with media containing glycols and/or catalysts.

The hot melt adhesives according to the invention are suitable for bonding a wide variety of substrates such as metals, wood, products containing wood, paper, glass, ceramics, leather or plastics in a solid form or as foams, such as PVC, PUR, ABS, polyethylene or polypropylene, and each of these materials may be bonded to an identical material or to the other materials mentioned. The adhesives may be used for a wide variety of applications, for example as an assembly adhesive for temporarily fixing structural parts, as adhesive for book-binding, in which an early build-up of strength is obtained by the rapid crystallization so that short cycle times can be obtained in conventional bookbinding machines; for the rational production of bonded flat materials which are immediately subjected to high tensions after they have been bonded and therefore require an adhesive with a high initial strength which builds up rapidly, as for example for the bonding of shoe soles; for the manufacture of furniture; for the production of hat racks; for the production of internal parts of motor vehicles.

The percentages given in the following Examples are all percentages by weight.

EXAMPLES

General method of preparation for the silylation of the polyhydroxyl compounds

1 OH Equivalent of a polyhydroxyl compound and 0.7 mol of hexamethylsilazane are stirred together with the addition of 2 ml of trimethylchlorosilane at 80° to 120° C. until no more ammonia is split off. The reaction may be followed IR spectroscopically from the reduction in the OH band. As soon as no OH band is visible any more, excess disilazane is removed by distillation at reduced pressure.

EXAMPLE 1

Prepolymer based on a silylated polyester:
2073 g of a bis-trimethylsiloxy polyester (base polyester of adipic acid and hexanediol, OH number 28, melting point 55° to 58° C.) and 175.5 g of 6-isocyanato caproic acid chloride are stirred together at 80° to 100° C. with the addition of 1 ml of pyridine until no more acid chloride bands are seen in the IR spectrum. Trimethylchlorosilane formed during the reaction is continuously distilled off.

0.05% by weight of dibutyl tin dilaurate are added after removal of residues of volatile constituents by thin layer distillation at 140° C./0.05 mbar. The isocyanate prepolymer obtained has the following characteristic data:

NCO content: 1.75%
Melting point: 55° to 59° C.
Viscosity: 600 mPa.s/120° C.

EXAMPLE 2

Prepolymer based on a silylated polyester:

1573 g of a bis-trimethylsiloxypolyester (base polyester of adipic acid and hexane diol, OH number 37.3, melting point 50° to 53° C.) and 175.5 g of 6-isocyanato-caproic acid chloride are reacted as in Example 1 with the addition of 1 ml of pyridine. Trimethylchlorosilane is distilled off during the reaction with constant reduction in pressure.

The reaction mixture is stirred for 4 hours at 90° C./1 mbar after the IR spectrum ceases to show an acid chloride band and 0.05% by weight of dibutyl tin dilaurate are added thereafter. The isocyanate prepolymer obtained has the following characteristic data:

NCO content: 2.49%
Melting point: 52° to 55° C.
Viscosity: 5400 mPa.s/120° C.

EXAMPLE 3

Prepolymer based on a silylated polyester:

1573 g of the bis-trimethylsiloxypolyester from Example 2 are reacted as in Example 2 with 30 g of terephthalic acid dichloride and 123 g of 6-isocyanato-caproic acid chloride with the addition of 1 ml of pyridine. After the addition of 0.05% by weight of dibutyl tin dilaurate, the isocyanate prepolymer has the following characteristic data:

NCO content: 1.78%
Melting point: 53° to 55° C.
Viscosity: 5800 mPa.s/120° C.

EXAMPLE 4

Prepolymer based on a silylated polycarbonate:

1073 g of a bis-trimethylsiloxy polycarbonate (based on a polycarbonate of hexanediol and diphenyl carbonate, OH number 56, melting point 49° to 52° C.) and 175.5 g of 6-isocyanatocaproic acid chloride are reacted as in Example 1 with the addition of 1 ml of pyridine. 0.05% by weight of dibutyl tin dilaurate are added after the removal of residues of volatile constituents by thin layer distillation at 140° C./0.05 mbar. The isocyanate prepolymer obtained has the following characteristic data:

NCO content: 3.35%
Melting point: 45° to 49° C.
Viscosity: 1400 mPa.s/120° C.

Use According To The Invention

The prepolymers heated to 120° C. are applied to beechwood samples measuring 120×25×4 mm by means of a hot melt spray gun with heatable cartridge (Beyer & Otto, Kleinostheim).

Immediately after application of the adhesive, the sample is bonded to a second, similar sample of beechwood with the two samples overlapping over an area of 25×25 mm. The joint is adjusted to a thickness of about 0.2 mm by means of a spacer.

The test samples thus bonded together are tested for their combined tension and shear resistance after 5 minutes, and after 7 days storage at 23° C. and 50% relative humidity in accordance with DIN 53 283. The results given are average values obtained from five measurements.

The setting time is the time within which the freshly bonded beechwood samples can still be displaced in relation to one another by firm finger pressure.

| Example | Setting time | Tension and shear resistance after 5 min. | Tension and shear resistance after 7 days |
|---------|--------------|-------------------------------------------|-------------------------------------------|
| 1 | 2 sec | 3.8 N/mm$^2$ | 8.9 N/mm$^2$ |
| 2 | 4 sec | 3.7 N/mm$^2$ | 5.8 N/mm$^2$ |
| 3 | 6 sec | 0.9 N/mm$^2$ | 6.0 N/mm$^2$ |
| 4 | 7 sec | 2.9 N/mm$^2$ | 8.2 N/mm$^2$ |

What is claimed is:

1. A process for bonding substrates comprising applying a hot-melt adhesive to the surface of at least one of the substrates and contacting the surface of said substrate with a surface of the other substrate, said adhesive containing an ester group-containing polyisocyanate which is a solid below 30° C. and liquid above 100° C., corresponding to formula (I)

$$A(OCO-B-NCO)_n \qquad (I)$$

in which
n stands for a whole number or a fraction (statistical average) of from 2 to 6,
A stands for an n-valent organic group such as is obtained by removal of hydroxyl groups from an n-valent polyhydroxyl compound in the molecular weight (Mn) range of from 800 to 6000 containing ester and/or carbonate groups and
B stands for an aliphatic, cycloaliphatic or aromatic hydrocarbon group having up to 18 carbon atoms.

2. The process of claim 1 characterized in that the polyisocyanate of formula (I) is a compound wherein
n denotes a whole number or a fraction from 2 to 3,
A stands for an n-valent group such as is obtained by removal of hydroxyl groups from an n-valent polyhydroxyl compound in the molecular weight (Mn) range of from 1000 to 5000 containing ester and/or carbonate groups, and
B stands for an aliphatic hydrocarbon group having 2 to 10 carbon atoms.

3. The process of claim 1, characterized in that the polyisocyanate of formula (I) is obtained by the reaction of an O-silylated polyhydric alcohol corresponding to the general formula (II)

$$A[-OSiR_3]_n \qquad (II)$$

with an isocyanato carboxylic acid chloride corresponding to the general formula (III)

$$ClOC-B-NCO \qquad (III)$$

of a chlorosilane corresponding to the general formula (IV)

$$Cl-SiR_3 \qquad (IV)$$

in which
n, A and B have the meanings indicated in claim 1 and

R stands for an alkyl group having 1 to 4 carbon atoms or a phenyl group.

4. The process of claim 2, characterized in that the polyisocyanate of formula (I) is obtained by the reaction of an O-silylated polyhydric alcohol corresponding to the general formula (II)

$$A[-OSiR_3]_n \qquad (II)$$

with an isocyanato carboxylic acid chloride corresponding to the general formula (III)

$$ClOC-B-NCO \qquad (III)$$

with splitting off of a chlorosilane corresponding to the general formula (IV)

$$Cl-SiR_3 \qquad (IV)$$

in which
n, A and B have the meanings indicated in claim 2 and R stands for an alkyl group having 1 to 4 carbon atoms or a phenyl group.

5. The process of claim 1 wherein the polyisocyanate according to formula (I) in the hot melt adhesives is optionally present in combination with auxiliary agents and additives.

6. The process of claim 1 wherein the substrates are identical or different materials and selected from the group consisting of metals, glass, wood, paper, ceramics, leather and plastics.

* * * * *